United States Patent [19]

Vaughan

[11] Patent Number: 4,657,749
[45] Date of Patent: Apr. 14, 1987

[54] STOICHIOMETRIC PROCESS FOR PREPARING A ZEOLITE OF THE L TYPE

[75] Inventor: David E. Vaughan, Flemington, N.J.

[73] Assignee: Exxon Research and Engineering Company, Florham Park, N.J.

[21] Appl. No.: 865,912

[22] Filed: May 13, 1986

Related U.S. Application Data

[63] Continuation of Ser. No. 550,896, Nov. 10, 1983, abandoned.

[51] Int. Cl.⁴ ............................................. C01B 33/28
[52] U.S. Cl. .................................... 423/329; 423/328; 423/118
[58] Field of Search ............... 423/328 C, 328 Z, 118, 423/329

[56] References Cited

U.S. PATENT DOCUMENTS

| | | | |
|---|---|---|---|
| 3,119,659 | 1/1964 | Taggart et al. | 423/118 |
| 3,123,441 | 3/1964 | Haden, Jr. et al. | 423/328 Z |
| 3,216,789 | 11/1965 | Breck et al. | 423/328 |
| 3,298,780 | 1/1967 | Fleck | 502/60 |
| 3,808,326 | 4/1974 | McDaniel et al. | 423/329 |
| 3,837,877 | 9/1974 | Bertorelli | 423/328 Z |
| 3,867,512 | 2/1975 | Young | 423/329 |
| 4,018,870 | 4/1977 | Whittam | 423/329 |
| 4,343,723 | 8/1982 | Rogers et al. | 423/328 Z |
| 4,544,539 | 10/1985 | Wortel | 423/328 C |
| 4,554,146 | 11/1985 | Vaughan | 423/118 |

FOREIGN PATENT DOCUMENTS

| | | | |
|---|---|---|---|
| 1202511 | 8/1970 | United Kingdom | 423/328 |
| 1393365 | 5/1975 | United Kingdom | 423/329 |
| 1394163 | 5/1975 | United Kingdom | 423/328 |

OTHER PUBLICATIONS

Breck "Zeolite Molecular Sieves", 1974, pp. 313-320.

*Primary Examiner*—John Doll
*Assistant Examiner*—Lance Johnson
*Attorney, Agent, or Firm*—Janet Hasak; Henry Naylor

[57] ABSTRACT

A zeolite of the L type is prepared by an approximately stoichiometric process wherein the zeolite is crystallized from a reaction mixture aged at from 80° to 260° C. containing specified ranges of molar ratios of KOH (and optionally a minor amount of NaOH), water, potassium silicate, and a source of alumina preferably derived from kaolin or halloysite. Most preferably, the source of alumina is metakaolin.

7 Claims, No Drawings

STOICHIOMETRIC PROCESS FOR PREPARING A ZEOLITE OF THE L TYPE

This applicaion is a continuation of application Ser. No. 550,896, filed 11/10/83, now abandoned.

BACKGROUND OF THE INVENTION

This invention relates to a novel and improved process for synthesizing a zeolite L type material. In particular, the preparation procedure of this invention utilizes stoichiometric, or nearly stoichiometric, quantities of raw materials such that the ratio of product to reactants approaches unity. In view of the increasing importance of developing energy efficient processing, and the need to reduce the discharge of environmentally dangerous substances, such processes have major industrial importance. Compared with conventional processes for preparing L type zeolites, the method of this invention is superior from the viewpoints of energy and raw material utilization for a given product quality and yield, and has far superior environmental characteristics.

A synthetic, crystalline potassium-containing zeolite designated as zeolite L is known to exhibit good catalytic properties, particularly for hydrocarbon conversion, and advantageous sorbent properties as described, for example, by Barrer et al., *Surface Science*, 12, 341 (1968). The chemical composition of zeolite L is disposed in U.S. Pat. No. 3,216,789 to be:

0.9 to 1.3 $(M_{2/n})O:Al_2O_3:5.2$ to 6.9 $SiO_2:xH_2O$ where M is exchangeable cation of valence n and x is from 0 to 9. Zeolite L also has a characteristic X-ray diffraction pattern, and its structure has been determined by Barrer et al., *Zeit. Krist.*, 128, 352 (1969). The X-ray diffraction pattern of zeolite L has the following more significant d (Å) values:

16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

The preparation of zeolite L described in U.S. Pat. No. 3,216,789 involves crystallizing the zeolite from a reaction mixture having a mole ratio of silica to alumina which is significantly higher than the ratio in the formed zeolite. Specifically, the reaction mixture comprises mole ratios:

| $K_2O/(K_2O + Na_2O)$ | 0.33–1 |
| $(K_2O + Na_2O)/SiO_2$ | 0.35–0.5 |
| $SiO_2/Al_2O_3$ | 10–28 |
| $H_2O/(K_2O + Na_2O)$ | 15–41 |

Another typical preparation of zeolite L as disclosed by Breck, *Zeolite Molecular Sieves*, New York: J. Wiley, 283 (1974) employs an excess of $SiO_2$ and a greater excess of $K_2O$. Typically the excess KOH in the effluent must be neutralized with sulphuric acid, and the excess silica must be precipitated, filtered, and either reused or discarded. The final effluent will still contain colloidal silica which must be removed by polishing processes before discharge. Recycle processes using the mother liquor are usually rapidly degraded because impurity nuclei are also recycled and these rapidly overwhelm the primary product, resulting in the discard of whole batches. In the K,NaL or KL synthesis system, common impurities showing this behavior are phillipsite and merlinoite (Passaglia et al., *Amer. Mineralogist*, (1978), p. 355), also called KM (Barrer et al., *J. Chem. Soc.* (1956) p. 2882) or Linde W (U.S. Pat. No. 3,012,853).

British Pat. No. 1,202,511 describes a revised zeolite L preparation using lower proportions of silica in the reaction mixture which comprises mole ratios of reactants as follows:

| $K_2O/(K_2O + Na_2O)$ | 0.7–1 |
| $(K_2O + Na_2O)/SiO_2$ | 0.23–0.35 |
| $SiO_2/Al_2O_3$ | 6.7–9.5 |
| $H_2O/(K_2O + Na_2O)$ | 10.5–50 |

The ratio $H_2O/(K_2O+Na_2O+SiO_2+Al_2O_3)$ is preferably not greater than 6 to give a "dry gel" as product. The source of silica employed is a solid, amorphous silica.

U.S. Pat. No. 3,867,512 discloses a preparation of zeolite L from a reaction mixture having a molar composition:

| $K_2O/(K_2O + Na_2O)$ | 0.3–1 |
| $(K_2O + Na_2O)/SiO_2$ | 0.3–0.6 |
| $SiO_2/Al_2O_3$ | 10–40 |
| $H_2O/(K_2O + Na_2O)$ | 15–140 | in which the silica source is a gel having at least 4.5 weight percent water and prepared in a particular manner.

L. Wilkosz in *Pr Chem* 409 (1974)—*Chemical Abstracts*, 90 (1979) 573478 describes the preparation of zeolite L from a synthesis sol prepared by treating a solution containing silica, potassium hydroxide and sodium hydroxide with a second solution containing potassium aluminate, potassium hydroxide and sodium hydroxide and crystallizing for 72 hours at 20° C. and 122 hours at 100° C. The zeolite L product has a $SiO_2:Al_2O_3$ ratio of 6.4:1, derived from input stoichiometries having $SiO_2/Al_2O_3$ ratios between 15 and 30.

G. V. Tsitsishvilli et al. in *Doklady Akademii NaikSSSR*, 243, 438–440 (1978) describe the synthesis of zeolite L from alumina-silica gels containing tributylamine. The gels used had the following molar ratios:

| $SiO_2:Al_2O_3$ | 25 |
| $(K_2O + Na_2O):Al_2O_3$ | 18 |
| $(K_2O + Na_2O):SiO_2$ | 0.72 |
| $H_2O/(K_2O + Na_2O)$ | 20 |
| $K_2O:Na_2O$ | 0.5 |

Y. Nishiimura in *Nippon Kagaku Zasshi*, 91, 1046-9 (1970) describes in general terms zeolite L preparation from a synthesis mixture containing colloidal silica, potassium aluminate and potassium hydroxide having a $SiO_2:Al_2O_3$ ratio of 15-25, but exemplifies only two synthesis mixtures having the following ratios of components:
7K$_2$O:Al$_2$O$_3$:20SiO$_2$:450H$_2$O; and
8K$_2$O:Al$_2$O$_3$:10SiO$_2$:500H$_2$O.

Other workers have prepared zeolite L from gels, mixed base systems and metakaolin. See, e.g., Aiello and Barrer, *J. Chem. Soc. Dalton*, 1470 (1970); Barrer et al., *J. Chem. Soc. Dalton*, 1258 (1972); Barrer et al., *J. Chem. Soc. Dalton*, 934 (1974); and U.S. Pat. No. 3,867,512 to Young. All of these syntheses, however, employ large excesses of reactants and do not result in stoichiometric conversions.

U.S. Pat. No. 3,298,780 describes zeolite UJ having a composition, expressed as mole ratios of oxides, corresponding to 0.9±0.2R$_{2/w}$O:Al$_2$O$_3$:5.0±1.5SiO$_2$:wH$_2$O wherein R represents at least one cation having a valence of not more than 4, v represents the valence of R and w can be any value up to about 5, said zeolite having an X-ray powder diffraction pattern essentially as shown in the following table:

| Interplanner spacing, d (Å) | Relative Intensity |
| --- | --- |
| 16.25 ± 0.25 | VS |
| 7.55 ± 0.15 | M |
| 6.50 ± 0.10 | M |
| 5.91 ± 0.10 | W |
| 4.61 ± 0.05 | S |
| 3.93 ± 0.05 | S |
| 3.67 ± 0.05 | W |
| 3.49 ± 0.05 | M |
| 3.29 ± 0.05 | W |
| 3.19 ± 0.05 | M |
| 3.07 ± 0.05 | M |
| 2.92 ± 0.05 | M |
| 2.66 ± 0.05 | W | prepared by a process comprising preparing an aqueous reactant solution having a composition, expressed as mole ratios of oxides, corresponding to
SiO$_2$/Al$_2$O$_3$ of from 6 to 30,
R$_{2/v}$O/SiO$_2$ of from 0.30 to 0.70, and
H$_2$O/R$_{2/v}$O of from 80 to 140;
and maintaining said reactant solution at a temperature between 150° F. (65.6° C.) and 325° F. (162.8° C.) until the zeolite crystals are formed Zeolite UJ is described as having nearly cubic shaped crystals with a crystal size ranging upward from 0.05 micron.

GB. No. 1,393,365 describes zeolite AG1, related to zeolite L, having the molar composition other than water:
1.05±0.3M$_2$O:Al$_2$O$_3$:4.0−7.5SiO$_2$
wherein M is potassium or a mixture of potassium and sodium, a characteristic X-ray powder diffraction pattern, and being capable of adsorbing at least 3% w/w perfluorotributylamine. As the zeolite L pore structure is too small to allow penetration by this molecule, zeolite AG-1 cannot be highly pure zeolite L.

SUMMARY OF THE INVENTION

According to this invention a crystalline, potassium-containing zeolite of the L type (both in structure and composition) may be prepared by a novel process, characterized by its efficiency, comprising:

(a) preparing a reaction mixture comprising water, potassium silicate, a source of alumina, preferably derived from kaolin or halloysite, KOH, and up to about 30% by mole fraction of NaOH based on total KOH and NaOH, said reaction mixture having a composition, in terms of mole ratios of oxides, within the following ranges:

| | |
| --- | --- |
| K$_2$O:Al$_2$O$_3$ | 1.0 to 3.3 |
| Na$_2$O:Al$_2$O$_3$ | 0 to 1.0 |
| SiO$_2$:Al$_2$O$_3$ | 5 to 12 |
| H$_2$O:Al$_2$O$_3$ | 80 to 140 | and
(b) maintaining the reaction mixture, while it is substantially homogeneous, at a temperature between about 80° and 260° C. under autogenous pressures for between about 1 and 10 days to form crystals of a zeolite having a composition, in terms of mole ratios of oxides, in the range:
1.0 to 1.1M$_2$O:Al$_2$O$_3$:5.0 to 7SiO$_2$:1 to 6H$_2$O
where M is either K or a mixture of K and Na where Na is no more than 30 mole percent of the mixture.

The process herein results in higher reaction efficiencies because stoichiometric or nearly stoichiometric conversion of reactants to products occurs. As a result, high yields of relatively pure product are obtained and undesirable effluents from the process such as excess silica and potassium oxide are minimized or eliminated. Furthermore, the low amount of excess base employed in the synthesis herein requires less acid (such as H$_2$SO$_4$) to neutralize the effluent. Moreover, whereas Zeolite L in conventional methods is difficult to recover from the mother liquor due to incomplete crystallization and fine crystalline size, the product obtained using the process herein is easily filtered from the mother liquor. Whereas most conventional zeolite L synthesis processes use expensive colloidal silicas as the source of SiO$_2$, the processes described herein use low cost commercially available potassium silicate or calcined kaolin.

DESCRIPTION OF THE PREFERRED EMBODIMENTS

In the process represented by this invention a reaction mixture is prepared, generally as a slurry, comprised of potassium hydroxide, and optionally in conjunction with the potassium hydroxide up to about 30 mole percent of sodium hydroxide, preferably no more than 20 mole percent of NaOH, based on total combined moles of sodium and potassium hydroxide, Preferably, no sodium hydroxide is present because it promotes the formation of zeolite P and other impurities. In addition, the reaction mixture contains water, a source of alumina, and a source of silica which includes necessarily potassium silicate. The use of potassium silicate ensures preparation of products of high purity. While 100% of the silica may be derived from potassium silicate, up to 40% by weight of the silica may be derived from colloidal silica and the remainder from potassium silicate. Another partial source of silica in place of colloidal silica is derived from the mother liquor from the previous batch. Thus, the filtrate from the filtered zeolite product is gelled with sulfuric acid to precipitate potassium silicate and to destroy impurity nuclei. The gel is then filtered and recycled to a future reaction mixture batch to which is added potassium silicate and a source of alumina.

The alumina source may be an acid salt such as aluminum sulfate, calcined kaolin or halloysite, or potassium or sodium aluminate prepared by dissolving $Al_2O_3 \cdot 3H_2O$ in caustic solutions. It is most preferably metakaolin, which has a theoretical oxide formula of $Al_2O_3 : 2SiO_2$. Metakaolin is preferred in that it eliminates gellation problems that frequently promote impurity formation. The metakaolin may be obtained, for example, by heating kaolin or halloysite clay, having an oxide formula of $Al_2O_3 : 2SiO_2 \cdot xH_2O$ ($x = 1$ or 2, respectively), at over 600° C. for about two or more hours to remove the water of hydration therefrom and to render the structures amorphous and reactive.

The amounts of ingredients in the reaction mixture will vary considerably depending, e.g., on the types of ingredients employed (e.g., the source of silica) and the particular composition ultimately desired. In general, however, the relative amounts of ingredients will be such that the reaction mixture will have a composition, in terms of mole ratios of oxides, within the following effective general and preferred ranges:

| Oxide Constituents | Ranges of Mole Ratios | |
| --- | --- | --- |
| | General | Preferred |
| $K_2O:Al_2O_3$ | 1.0 to 3.3 | 1 to 3.0 |
| $Na_2O:Al_2O_3$ | 0 to 1.0 | 0 |
| $SiO_2:Al_2O_3$ | 5 to 12 | 5 to 9 |
| $H_2O:Al_2O_3$ | 80 to 140 | 110 to 140 |

Thus, sodium comprises up to 30 mole percent of the mixture in the case where sodium hydroxide is employed.

The stoichiometry indicates that when potassium silicate ($SiO_2/K_2O = 0.33$) is the only source of silica (i.e., no metakaolin is added), part of the alumina may be added as an acidic salt (usually $Al_2(SO_4)_3$ because of its ready availability and low cost). Thus the potassium in excess of the effective stoichiometry neutralized by the acidic alumina source forming potassium sulfate, which has no significant effect on the crystallization of zeolite L. The effective base may also be balanced by addition of the acid itself (e.g., $H_2SO_4$), in which case all of the alunina will be added as the aluminate. The most effective route is usually decided by cost and availability of the necessary raw materials. Although this neutralization step can be avoided by using silica sols or gels together with potassium silicate, in the all-synthetic preparations (i.e., there is no mineral metakaolin component), such sol or gel addition usually increases cost and decreases reactivity. As such, it is a less preferred way to achieve the claimed stoichiometry, and often yields lower quality products.

The order of mixing of the ingredients is not important. However, it is essential to homogenize the mixture fully before reacting it to form the zeolite L.

One method involves dissolving the potassium and sodium hydroxides in the water and adding to this solution an alumina source and potassium silicate. When sodium and/or potassium silicate is used as the sole silica source, improved homogenization is achieved by adding excess $H_2O$ to the silicate, then adding the aluminate (separately made by dissolving $Al_2O_3$ in KOH and NaOH), then the aluminum sulfate or acid. Mixing continues throughout these additions. The reaction mixture is ordinarily prepared in a container made of metal or glass or the like which is preferably closed to prevent water loss, or equipped so as to maintain constant water levels. If mixing is done in a reactor with poor mixing efficiency, it may be desirable to start heating the gel slurry prior to complete addition of the components.

After the reaction mixture is formed it is placed in a reactor where it is maintained at a temperature of between about 80° and 260° C., preferably 80° and 100° C. for commercial purposes, to induce crystallization. Even though temperatures above about 100° C., and thus non-atmospheric pressures, may be used, general industrial practice is to operate at one atmosphere pressure. An important advantage of the process described herein is that the component materials are sufficiently reactive to form zeolite L in high yield and purity at one atmosphere of pressure (i.e., at 100° C. or below) in reasonable reaction times, in addition to being reactive at higher temperatures.

During crystallization the reaction mixture must be maintained in a substantially homogeneous state, i.e., settling of the reactant solids at the bottom of the reactor is minimized to the extent possible. For example, metakaolin tends to settle out of the reaction mixture if there is insufficient stirring. If the reaction mixture is not substantially homogeneous, the crystallized product ultimately obtained will comprise a mixture of products and will thus be impure. Homogeneity may be achieved by homogenization of the reaction mixture after it is formed by thorough blending until the desired degree of homogeneity is obtaind. The mixing may take place in any vessel in which complete mixing can be effected such as in a blender or a reaction vessel equipped with an agitator. In the cases where metakaolin is not a component of the synthesis, stirring is not necessary during crystallization.

Alternatively, the reaction mixture after its formation can be subjected immediately to the elevated reaction temperatures above prescribed, with slow stirring thereof to ensure substantial homogeneity and avoid settling of metakaolin and the zeolite product. The actual speed of stirring employed will vary depending on, e.g., the particle size of the metakaolin.

During heating of the substantially homogeneous reaction mixture, autogenous pressures are maintained which will depend on the temperature employed. For example, pressures of 1 atm may be adequate for temperatures at the lower range, but at high temperatures of, e.g., 120° C. or more, higher pressures may be achieved. The amount of time required for heating will depend mainly on the temperature employed and slurry composition, so that at 100° C. the heating may be carried out, e.g., for up to 6 or 7 days, whereas at about 160° C. the time period may be, e.g., 3 to 4 days. In general, the period of heating will be from 1 to 10 days until the maximum amount of crystals is formed of the desired zeolite product, i.e., zeolite crystals having the following range of composition:

1.0 to 1.1$M_2O:Al_2O_3:5.0$ to 7$SiO_2:1$ to 6$H_2O$ where M is as defined above, and having an X-ray diffraction pattern indicating its structure as of the L type. The crystallization time may be shortened by seeding the slurry to be crystallized with minor amounts of a source or nuclei or crystals such as, e.g., zeolite L as described in U.S. Pat. No. 3,216,789 or a zeolite L type aluminosilicate, which has preferably been milled or cryochopped to crystal sizes below about 0.1 micron. Preferably, before maintaining the reaction mixture at 80° to 160° C. a zeolite is added to the mixture in an amount of from 0.1 to 20% by weight based on silica and alumina, the zeolite having the composition, in terms of mole ratios of oxides, in the range:

0.9 to 1.3(Na,K)$_2$O:Al$_2$O$_3$:5.2 to 6.9SiO$_2$0 to 9H$_2$O

Nucleation may also be induced by aging the slurry or a portion of the slurry at about 10° to 100° C. for about 6 hours to 6 days prior to the crystallization at 80°–160° C. The nucleation method described in copending U.S. pat. appl.Ser. No. 550,890 to D. E. W. Vaughan filed of even date, and now abandoned entitled "Process for Preparing Type L Zeolites by Nucleation Technique" is particularly effective in shortening crystallization times.

When the zeolite crystals have been obtained in sufficient amount, they are recovered by filtration from the reaction mixture and are then washed, preferably with deionized or distilled water, to wash away excess mother liquor. The washing should continue, for best purity results, until the wash water, equilibrated with the product, has a pH of between about 7 and 12. The closer to unity the ratio of (K+Na) to Al, the better is the KL product in terms of sorption capacity. After the washing step, the zeolite crystals may be dried or calcined.

The zeolite prepared by the process of this invention, which is of the zeolite L type, may be used as a sorbent or as a catalyst, e.g., in a hydrocarbon conversion process such as in cracking or reforming operations, isomerization, aromatization, or alkylation and in the hydrocracking of lube stocks and fuels. To be employed for these applications, the zeolite prepared by the above method may be at least partially dehydrated by drying at temperatures of up to about 500° C. or more until most or all of the water of hydration is removed.

It may also be desired to exchange part or all of the potassium (and optionally sodium) cations in the zeolite structure with other cations or to use the acid form of the zeolite containing hydrogen as the cation. Suitable exchangeable cations for this purpose include any cations of metals selected from any of Group I through VIII of the Periodic Table. Preferably, such cations include mono-, di- and trivalent metal ions, paticularly those of Groups I, II and III such as barium, sodium, potassium, calcium, cesium, lithium, magnesium, strontium, and zinc ions, and other cations such as rare earth, ammonium and alkylammonium cations. This replacement may be accomplished by conventional ion-exchange techniques as discussed, for example, in U.S. Pat. No. 3,216,789.

Subsequent addition of metals may be accomplished by exchange or impregnation of salts or complexes, followed by appropriate reduction and calcining.

The process described herein represents an improved, efficient and environmentally sound procedure for preparing the zeolite since there is little waste of the reactants employed, the product is readily separated from the mother liquor, and the raw materials are relatively inexpensive and readily available commercially.

The examples which follow illustrate the efficacy of the invention. In all examples, parts and percentages are given by weight and temperatures in degrees Centigrade unless otherwise noted.

EXAMPLE 1

A total of 13. 3 g KOH (in an 85% aqueous solution) was dissolved in 431 g of H$_2$O. To this solution was added 218.3 g of potassium silicate (containing 12.5% K$_2$O and 26.3% SiO$_2$), followed by 73.4 g of metakaolin. The composition of the resulting slurry, expressed in terms of mole ratios of oxides, was:

| | |
|---|---|
| K$_2$O:Al$_2$O$_3$ | 1.2 |
| SiO$_2$:Al$_2$O$_3$ | 5.1 |
| H$_2$O:Al$_2$O$_3$ | 100 |

The slurry was then homogenized in a blender set at medium speed for 10 minutes and divided into three parts. These three portions were transferred to small autoclaves and heated to and maintained at 100° C., 160° C. and 220° C., respectively, for three days. After reaction the products were filtered, washed and dried. All samples comprised a pure zeolite, as indicated by chemical analysis, giving a composition of:

K$_2$O:Al$_2$O$_3$:5.1SiO$_2$ and by X-ray diffraction, which was essentially indentical to that disclosed for zeolite L in U.S. Pat. No. 3,216,789, the disclosure of which is incorporated herein by reference. The sample maintained at 220° C. comprised hexagonal columnar crystals 0.3 micron in diameter and 2 micron in length.

EXAMPLE 2

A slurry having a composition, in terms of mole ratios of oxides, of:

| | |
|---|---|
| K$_2$O:Al$_2$O$_3$ | 1.05 |
| SiO$_2$:Al$_2$O$_3$ | 5.1 |
| H$_2$O:Al$_2$O$_3$ | 100 | was prepared by mixing together 6.4 g of KOH, 73.4 g of metakaolin, 218.3 g of potassium silicate, and 431.2 g of H$_2$O. After homogenizing this slurry in a blender for five minutes, the slurry was maintained in an autoclave for three days at 220° C. and then filtered. The product obtained on washing and drying the filtrate was a highly crystalline pure zeolite of the L type, as shown by X-ray diffraction analysis, having a composition of: K$_2$O:Al$_2$O$_3$:5.1SiO$_2$

EXAMPLE 3

A slurry having a composition, in terms of mole ratios of oxides, of:

| | |
|---|---|
| K$_2$O:Al$_2$O$_3$ | 1.4 |
| SiO$_2$:Al$_2$O$_3$ | 5.1 |
| H$_2$O:Al$_2$O$_3$ | 110 | was prepared by mixing together 20.17 g of KOH.0.5-H$_2$O in 488 g water, 218.3 g of potassium silicate containing 26.3% by weight SiO$_2$ and 12.5% by weight K$_2$O, and 73.4 g of metakaolin. After homogenization the slurry was transferred to a tetrafluoroethylene jar, sealed and placed in an oven at 100° C. After five days the slurry was filtered, washed and dried. The product comprised a highly crystalline, pure L-type zeolite as shown by X-ray diffraction analysis.

EXAMPLE 4

A slurry having a composition, in terms of mole ratios of oxides, of:

| | |
|---|---|
| K$_2$O:Al$_2$O$_3$ | 1.4 |
| SiO$_2$:Al$_2$O$_2$ | 5.1 |
| H$_2$O:Al$_2$O$_3$ | 90 | was prepared by the method described in Example 3 except that 374 g of water was employed rather than 488 g of water. The slurry was homogenized and divided into two parts. The first part was placed in a tetrafluoroethylene jar and heated as described in Example 3. In 90 hours a pure L-type zeolite was obtained. The second part was placed in a glass resin kettle equipped with a stirrer and condenser and heated at 100° C. After 5 days the product comprised 95% of the highly crystalline L-type zeolite and 5% of a minor phillipsite impurity.

EXAMPLE 5

A slurry having a composition, in terms of mole ratios of oxides, of:

| | |
|---|---|
| $K_2O:Al_2O_3$ | 1.2 |
| $Na_2O:Al_2O_3$ | 0.2 |
| $SiO_2:Al_2O_3$ | 5.1 |
| $H_2O:Al_2O_3$ | 100 | was prepared by mixing together 13.4 g of an 85% aqueous solution of KOH, 4.8 g of NaOH, 73.4 g of metakaolin from a commercial source, 218.3 g of the potassium silicate used in Example 3, and 431 g of water. The resulting mixture was homogenized in a blender and reacted for 80 hours in a tetrafluoroethylene jar at 100° C. The product comprised a crystalline L-type zeolite containing a small amount of unreacted kaolin/metakaolin.

EXAMPLE 6 (COMPARATIVE)

A slurry having a composition, in terms of mole ratios of oxides, of:

| | |
|---|---|
| $K_2O:Al_2O_3$ | 1.0 |
| $Na_2O:Al_2O_3$ | 0.4 |
| $SiO_2:Al_2O_3$ | 5.1 |
| $H_2O:Al_2O_3$ | 100 | was prepared by dissolving 6.6 g of $KOH.0.5H_2O$ and 9.6 g of NaOh in 431 g of $H_2O$. Then 218.3 g of the potassium silicate used in Example 3 and 73.4 g of metakaolin were added thereto. After homogenization the slurry was divided into two portions. One portion was crystallized in a sealed tetrafluoroethylene jar at 100° C. for 4 days. The second portion was placed in a glass reaction resin kettle equipped with stirrer and condenser, and heated in a heating mantle for 4 days. In both cases the products were highly crystalline, but comprised almost equal amounts of the type L zeolite and zeolite P. Thus, high levels of sodium above about 30% by moles are undesirable in the zeolite slurry.

EXAMPLE 7

A slurry having a composition, in terms of mole ratios of oxides, of:

| | |
|---|---|
| $K_2O:Al_2O_3$ | 1.4 |
| $SiO_2:Al_2O_3$ | 6.0 |
| $H_2O:Al_2O_3$ | 100 | was prepared by mixing together 4.07 g of KOH, 33.8 g of metakaolinite (prepared by heating UF kaolin from Georgia Kaolin Co. for 3 hours at 650° C.), 130.5 g of the potassium silicate used in Example 3, and 181.7 g of $H_2O$. A 75-ml stainless steel tube autoclave was ⅔ filled with the slurry, and the mixture was reacted at 160° C. for five days. The product, which was filtered, washed and dried, comprised highly pure zeolite L.

EXAMPLE 8

A slurry having a composition, in terms of mole ratios of oxides, of:

| | |
|---|---|
| $K_2O:Al_2O_3$ | 1.5 |
| $SiO_2:Al_2O_3$ | 6 |
| $H_2O:Al_2O_3$ | 119 | was prepared by reacting together 6.5 g of KOH, 36.7 g of metakaolin (prepared by heating UF kaolin for 3 hours at 650° C.), 145 g of the potassium silicate used in Example 3, and 254 g of water. The homogenized slurry was placed in a sealed autoclave and aged at 160° C. for 6 days, after which time the autoclave was cooled and the product filtered and washed. The crystallized zeolite thus obtained was highly crystalline and had a composition, in terms of mole ratios of oxides, of: $K_2O:Al_2O_3:5.32SiO_2$.

EXAMPLE 9

A slurry having a composition, in terms of mole ratios of oxides, of:

| | |
|---|---|
| $K_2O:Al_2O_3$ | 2.5 |
| $SiO_2:Al_2O_3$ | 8.5 |
| $H_2O:Al_2O_3$ | 110 | was prepared by mixing together in a glass reaction bottle 81 g of metakaolin (from kaolin), 517.2 g of the potassium silicate used in Example 3, 25.7 g of 85% KOH and 375.4 g of $H_2O$. The mixture was brought to a gentle boil using a heating mantle. The bottle was equipped with condenser, thermometer, and stirrer, and the slurry was reacted at 100° C. for 6 days with slow stirring. After filtering, washing and drying at 100° C. the crystalline product was analyzed by X-ray diffraction and found to comprise pure zeolite of the L type. Scanning electron microscopy showed aggregates of 0.1 to 0.2 micron prismatic microcrystals. Chemical analysis showed that the composition, in terms of mole ratios of oxides, was $0.98 K_2O:Al_2O_3:5.54SiO_2$

EXAMPLE 10

A slurry having a composition, in terms of mole ratios of oxides, of:

| | |
|---|---|
| $K_2O:Al_2O_3$ | 2.88 |
| $SiO_2:Al_2O_3$ | 10 |
| $H_2O:Al_2O_3$ | 110 | was prepared by mixing and homogenizing 6.6 g of KOH, 28.8 g of metakaolin, 182 g of the potassium silicate used in Example 3, and 132.7 g of water. A total of 50 ml of this mixture was reacted in a 75-ml stainless steel tube autoclave at 160° C., and the remainder of the mixture was placed in a 500 ml tetrafluoroethylene jar and heated in an oven at 100° C. After five days the reaction at 160° C. yielded highly crystalline zeolite crystals of the L-type having a composition, in terms of mole ratios of oxides, of $0.95K_2O:Al_2O_3:5.26SiO_2$. The reaction at 100° C. was sampled at 5, 7 and 12 days. All samples showed highly crystalline zeolite of the L type and had no impurities even after 12 days of reaction.

The composition of the sample taken after 7 days, in terms of mole ratios of oxides, was found to be: $0.98K_2O:Al_2O_3:5.54SiO_2$

EXAMPLE 11

A composition having a stoichiometry:
$3K_2O:Al_2O_3:9SiO_2:135H_2O$
was made by diluting 1430 g K Sil #6 (P.Q. Corp.) potassium silicate with 300 g distilled water in a one gallon Hobart mixer, then slowly adding a cooled potassium aluminate solution (made by dissolving at reflux 108.5 g Alcoa C31 alumina ($Al_2O_3.3H_2O$) in a solution containing 200 g $H_2O$ and 131 g $KOH.\frac{1}{2}H_2O$). After thorough mixing and continued agitation, a solution of 87.3 g $H_2SO_4$ (98%) in 200 g distilled water was slowly added. After complete homogenization the gel was placed in 500 ml Teflon jars in a 100° C. air oven. After 3 days a sample comprised 46% zeolite L, and after 8 days the sample, which comprised excellent (pure) zeolite L was shown by X-ray diffraction analysis, had a chemical composition of:
$1.02K_2O:Al_2O_3:5.26SiO_2$
and a BET $N_2$ surface area of 436 $m^2/g$. Scanning electron microscopy showed that a zeolite L comprised 0.4 micron diameter aggregates of crystals in the size range of 0.05 to 0.1 micron diameter.

EXAMPLE 12

This example demonstrates the efficacy of seeding in the given composition range.

Slurry A was made by mixing in a 1 gallon Hobart mixer 100.7 g $KOH.\frac{1}{2}H_2O$, 81 g $Al_2O_3.3H_2O$, 1469 g K Sil 6 (potassium silicate of P.Q. Corp.), 126.4 g alum ($Al_2(SO_4)_3.17H_2O$) and 723 g $H_2O$ in the manner described in Example 11. After thorough homogenization the sample was placed in a six gallon polypropylene can. A second identical batch was then mixed and added to the can, which was then placed in an air oven at 100° C. The total composition had a stoichiometry of: $3K_2O:Al_2O_3:9SiO_2:135H_2O$.

Slurry B having the same stoichiometry was made two days later, but in a much larger batch (36 kilograms) consisting of:
1450 g $KOH.\frac{1}{2}H_2O$
1167 g $Al_2O_3.3H_2O$ (Alcoa C31)
21,147 g K Sil 6 (P.Q. Corp.)
1820 g alum ($Al_2(SO_4)_3.17H_2O$)
10,416 g $H_2O$.

After mixing in a commercial Hobart mixer in the general manner described in Example 11, the gel was divided between two six-gallon polypropylene cans. To each can was then added 1800 g of slurry A, which had now been hot aged for 2 days and showed minor zeolite L crystallization. After thorough mixing, both six-gallon cans were sealed and placed in an air oven at 98° C. After reacting for 66 hours the containers were cooled, and the contents filtered and washed. Analysis of the two samples showed excellent zeolite L by X-ray diffraction analysis, and chemical analysis gave compositions of:
Sample 1 $1.04K_2O:Al_2O_3:5.3SiO_2$
Sample 2 $1.06K_2O: Al_2O_3:5.08SiO_2$ BET $N_2$ surface areas were 291 $m^2/g$ for sample 1 and 305 $m^2/g$ for sample 2. The two samples were reslurried in deionized water, and the pH was adjusted to 8.5 with a few drops of HCl, then filtered and dried at 110° C. Chemical analysis showed no change in the Si/Al ratios but the K/Al ratios were now 0.98 and 1.0 for samples 1 and 2, respectively. BET nitrogen surface area measurements increased to 380 $m^2/g$ and 375 $m^2/g$, respectively. Scanning electron microscope analysis showed both samples to comprise 0.1 to 1 micron agglomerates of microcrystals less than 0.1 micron in diameter.

EXAMPLE 13

A reactant mixture having a stoichiometry of:
$2.4K_2O:Al_2O_3:8SiO_2:135H_2O$
was made by first dissolving 15.09 g $Al_2O_3.3H_2O$ in a solution of 18.2 g $KOH.\frac{1}{2}H_2O$ in 22 g $H_2O$ at reflux, cooling the resultant clear solution to room temperature, then blending this with 267.65 g K Sil 6 potassium silicate (12.5% $K_2O$, 26.3% $SiO_2$). To this homogenized mixture was added a solution of 32.1 g $Al_2(SO_4)_3.17H_2O$ dissolved in 48 g $H_2O$ with constant stirring, followed by 50 g of the partly crystallized batch made as described in Example 12 (slurry A). Water was then added to bring the total gel weight to 500 g, the gel was again homogenized, and then was placed in a 500 ml Teflon jar and sealed. The jar was placed in an air oven at 100° C. and sampled at intervals. Maximum crystallization was achieved after 6.5 days. X-ray diffraction analysis showed excellent zeolite L plus a trace of phillipsite. The product chemical composition was: $1.05K_2O:Al_2O_3:5.6SiO_2$. Scanning electron microscope analysis analysis showed the sample to comprise 0.3 to 1 micron aggregates of less than 0.1 micron crystals.

In summary, the present invention is seen to provide a process for preparing a zeolite of the L type involving a stoichiometric synthesis using potassium, and optionally sodium, as the initial exchange cation(s).

What is claimed is:

1. A process for preparing a crystalline, potassium-containing L zeolite having a composition, in terms of mole ratios of oxides, in the range:

0.9 to $1.3(M_2O):Al_2O_3:5.2$ to $6.9SiO_2:0.9H_2O$ where M is either K or a mixture of K and Na where Na is no more than 20 mole percent of the mixture, which process comprises:

(a) preparing with agitation a reaction mixture comprising water, and feed materials of potassium silicate, metakaolin, KOH and up to about 30% by mole fraction of NaOH based on total KOH and NaOH, and whereon potassium silicate and metakaolin are the only sources of silica in the reaction mixture, said reaction mixture having a composition, in terms of mole ratios of oxides, within the following ranges:

| $K_2O:Al_2O_3$ | 1.0 to 3.0 |
|---|---|
| $Na_2O:Al_2O_3$ | 0 to 1.0 |
| $SiO_2:Al_2O_3$ | 5 to 9 |
| $H_2O:Al_2O_3$ | 110 to 140 | said ratios being selected to permit recovery of essentially a stoichiometric amount of L zeolite crystals in step (c);

(b) maintaining the reaction mixture in a substantially homogeneous state, at between about 80° and 260° C. for between about 1 and 10 days until essentially a stoichiometric amount of crystals of said L zeolite are formed, and (c) recovering L zeolite crystals.

2. The process of claim 1 wherein NaOH is not employed in the reaction mixture.

3. The process of claim 1 wherein after step (a) but before step (b) the reaction mixture is blended sufficiently to form a substantially homogeneous mixture.

4. The process of claim 1 wherein the reaction mixture is maintained between 80° and 100° C.

5. The process of claim 1 wherein prior to step (b) microcrystals of an L type zeolite are added to the blended reaction mixture in an amount of from 0.1 to 20% by weight based on silica and alumina.

6. The process of claim 1 wherein prior to step (b) the blended reaction mixture is maintained at about 10° to 100° C. for from about 6 hours to 6 days.

7. A process for preparing a crystalline, potassium-containing L zeolite having a composition, in terms of mole ratios of oxides in the range:

0.9 to 1.3$K_2O$:$Al_2O_3$: 5.2 to 6.9$SiO_2$:0.9$H_2O$ which comprises:

(a) preparing a reaction mixture comprising water, and feed materials of KOH, potassium silicate and metakaolin, and wherein potassium silicate and metakaolin are the only sources of silica in the reaction mixture, said reaction mixture having a composition, in terms of mole ratios of oxides, within the following ranges:

| | |
|---|---|
| $K_2O$:$Al_2O_3$ | 1.0 to 3.0 |
| $SiO_2$:$Al_2O_3$ | 5 to 9 |
| $H_2O$:$Al_2O_3$ | 110 to 140 | said ratios being selected to permit recovery in step (d) of essentially a stoichiometric amount of type L zeolite crystals, (b) blending the reaction mixture sufficiently to form a substantially homogeneous mixture;

(c) maintaining the blended reaction mixture at between 80° and 100° C. for a sufficient period of time to produce essentially a stoichiometric amount of crystals of said L zeolite; and (d) recovering type L zeolite crystals.

* * * * *